June 23, 1959      T. L. DAHLBERG      2,891,574
BLEED-OFF STRUCTURE FOR COOLING TOWERS
Filed June 18, 1956
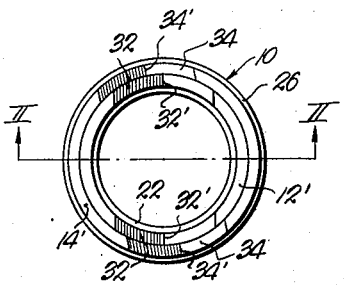
Fig. 1.
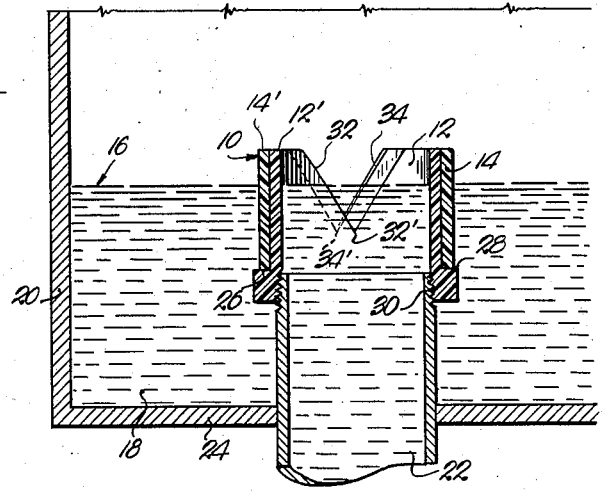
Fig. 2.
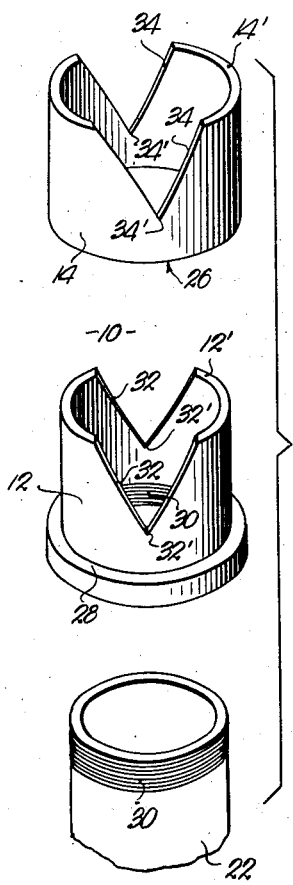
Fig. 3.
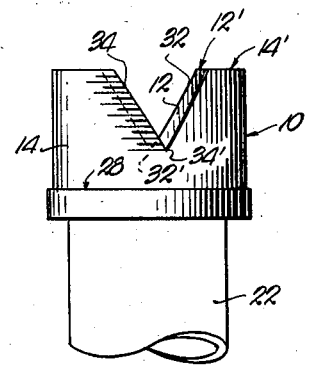
Fig. 4.
INVENTOR.
Theodore L. Dahlberg
BY
ATTORNEY.

United States Patent Office 2,891,574
Patented June 23, 1959

2,891,574

BLEED-OFF STRUCTURE FOR COOLING TOWERS

Theodore L. Dahlberg, Chicago, Ill., assignor to Deady Chemical Company, Kansas City, Mo., a corporation of Missouri Application June 18, 1956, Serial No. 592,025

1 Claim. (Cl. 137—577)

This invention relates to an adjustable weir bleed-off valve adapted to permit accurate adjustment of the bleed-off water in cooling towers, condensers, air conditioners or virtually any other type of tank wherein it is necessary to drain off water to maintain a predetermined concentration of solids or hardness in the water, the primary object being to provide a simple and inexpensive valve structure adapted either as an original installation or to permit relatively simple modification of existing structure by mere attachment to overflow pipes forming a part thereof.

It is the most important object of the present invention to provide bleed-off structure for cooling towers and the like following the hydraulic flow principle and adapted to be calibrated so that for a predetermined opening of the valve the amount of bleed-off will be measured accurately, provided only that the conventional float valves forming a part of the system are capable of maintaining a constant water level in the basin.

Another important object of the instant invention is to provide an adjustable V-notch weir adapted not only to provide variable bleed-off for control of concentrations in cooling towers, evaporative condensers and the like, but which also acts as a skimmer for removal of surface trash such as dead algae, slime and the like.

A further object of the present invention is the provision of structure of the kind above set forth for controlling cooling tower bleed-off, as well as concentrations, scale deposits and corrosions, all of which are held in check, thereby reducing the amount of chemical required for the complete control of such concentrations.

A still further object of the instant invention is to provide valve structure that is easily installed and easy to regulate to the end that the same might well be made available to refrigeration service engineers handling chemical controls for use by their customers as a means of complying with the bleed-off requirements set forth in the dosage charts accompanying the various products which they handle.

Other objects include important details of construction to be made clear as the following specification progresses, reference being had to the accompanying drawing, wherein:

Figure 1 is a top plan view of bleed-off structure for cooling towers made pursuant to the instant invention;

Fig. 2 is a vertical, cross-sectional view showing the structure in use within a water basin;

Fig. 3 is an exploded perspective view showing the valve parts and a portion of the overflow pipe to which the same are attached; and Fig. 4 is a side elevational view of the valve structure.

The valve shown in the drawing is broadly designated by the numeral 10 and includes a pair of relatively telescoped, preferably cylindrical, tubes 12 and 14, having uppermost, upwardly facing, annular edges 12′ and 14′ respectively, normally disposed within a common horizontal plane above the normal level 16 of water 18 within basin 20.

The innermost tube 12 surrounds an overflow pipe 22 adjacent the uppermost end of the latter, pipe 22 extending upwardly through bottom 24 of basin 20 and having its axis disposed vertically. The outer tube 14 is provided with a lowermost, downwardly facing, annular edge 26 that is slidably supported by an annular, upwardly facing shoulder 28 exteriorly of the inner tube 12 and integral therewith. Inner tube 12 is removably attached to the pipe 22 by screw threads 30 adjacent the shoulder 28.

While the tube 14 is rotatable with respect to the tube 12, the outside diameter of the latter is substantially the same as the inside diameter of tube 14 to the end that the tubes 12 and 14 are in slidable, frictional interengagement. It is noted that the tubes 12 and 14 are coaxial with the pipe 22 and therefore, the tube 14 rotates about the extended vertical axis of pipe 22.

Each of the tubes 12 and 14 is provided with a pair of diametrically opposed V-shaped notches 32 and 34 respectively. Notches 32—34 extend downwardly from uppermost edges 12′—14′ and therefore have their uppermost base ends within a common horizontal plane above the liquid level 16. The apex ends 32′ and 34′ of notches 32 and 34 respectively terminate below the level of liquid 16 and above the uppermost end of pipe 22. Notches 32 and 34 are all preferably identical and therefore, the widths thereof at their base ends are equal.

The depths of the notches 32—34, the angularity thereof (preferably about 60°) and the diameters of the tubes or sleeves 12—14 should be calculated to handle sufficient bleed-off requirements for towers ranging from the smallest to about 150-ton units. In any event, it is seen that by rotation of the tube 14 valve 10 is adjustable from zero to maximum flow, the latter adjustment being made possible when the notches 34—34 are fully aligned with the notches 32—32. By such construction of the V-notch weir the assembly is adapted to control concentrations of all kinds and also acts as a skimmer for removal of suspended solids and surface trash such as dead algae and slime within the water 18. By controlling concentration, scale deposition and corrosion can definitely be reduced and controlled. This in turn reduces the amount of chemical treatment required for complete control of scale and corrosion.

In existing units the valve 10 may be easily and quickly mounted by cutting and threading the overflow pipe 22 to the proper length so that the assembled height will be approximately the same as the height of the original overflow pipe. It is to be preferred that the valve 10 extend above the level 16 as illustrated in Fig. 2, so that the volume of bleed-off is accurately controlled by turning the tube 14, thereby adjusting the effective depths of the V-notches.

Having thus described the invention what is claimed as new and desired to be secured by Letters Patent is:

Structure for bleeding off water from the hot water basin of a water cooling tower having an open top pipe extending into the basin through the bottom thereof, a valve within the water in the basin comprising an inner, open top, cylindrical tube surrounding the uppermost end of the pipe and provided with an integral, outturned, upwardly-facing shoulder adjacent the lowermost edge thereof, screw threads adjacent the shoulder for removably attaching the inner tube to the pipe, and an outer, open top, cylindrical tube slidably telescoped on the inner tube and having a lower, annular, downwardly facing edge slidably engaging said shoulder, said tubes having upper, annular, upwardly facing edges disposed in a common, horizontal plane normally above the normal level of said liquid, said tubes being concentric with the vertical axis of the pipe and each having a pair of identical, diametrically opposed, upwardly facing, V-shaped notches extending downwardly from said upper edges thereof, said notches having their apexes terminating in a common, horizontal plane above the pipe and below said liquid level, the widths of the uppermost, base ends of all of said notches being the same, the outer tube being rotatable on the inner tube about said axis for moving its notches into and out of registering relationship with the notches of the inner tube, the outside diameter of the inner tube being substantially the same as the inside diameter of the outer tube.

References Cited in the file of this patent

UNITED STATES PATENTS

| | | |
|---|---|---|
| 204,278 | Anderson | May 28, 1878 |
| 697,109 | Strong | Apr. 8, 1902 |
| 1,109,768 | Laux | Sept. 8, 1914 |
| 1,618,151 | Fisher | Feb. 15, 1927 |
| 2,193,696 | Ramsaur | Mar. 12, 1940 |
| 2,197,250 | Davies | Apr. 16, 1940 |
| 2,608,993 | Andrews | Sept. 8, 1952 |

FOREIGN PATENTS

| | | |
|---|---|---|
| 667,971 | Germany | Nov. 24, 1938 |